United States Patent
Knigge et al.

(10) Patent No.: US 9,786,309 B1
(45) Date of Patent: Oct. 10, 2017

(54) DATA STORAGE DEVICE DETECTING MINIMUM STABLE FLY HEIGHT OF A HEAD OVER A DISK

(71) Applicant: Western Digital Technologies, Inc., San Jose, CA (US)

(72) Inventors: Bernhard E. Knigge, San Jose, CA (US); Noureddine Kermiche, Dana Point, CA (US); Robert E. Eaton, San Jose, CA (US); Puneet Bhargava, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/614,939

(22) Filed: Jun. 6, 2017

(51) Int. Cl.
*G11B 5/60* (2006.01)
*G11B 21/12* (2006.01)

(52) U.S. Cl.
CPC ............ *G11B 5/6011* (2013.01); *G11B 5/607* (2013.01); *G11B 5/6029* (2013.01); *G11B 5/6058* (2013.01); *G11B 5/6088* (2013.01); *G11B 21/12* (2013.01)

(58) Field of Classification Search
CPC .......................................... G11B 5/60–5/6076
USPC ............................................... 360/55, 69, 75
See application file for complete search history.

(56) References Cited

U.S. PATENT DOCUMENTS

| | | | |
|---|---|---|---|
| 6,700,724 B2 | 3/2004 | Riddering et al. | |
| 7,016,139 B2 * | 3/2006 | Baumgart | G11B 5/6005 360/75 |
| 7,233,451 B2 * | 6/2007 | Baumgart | G11B 5/6005 360/75 |
| 7,616,398 B2 | 11/2009 | Gong et al. | |
| 8,699,173 B1 | 4/2014 | Kang et al. | |
| 8,717,702 B2 * | 5/2014 | Zeng | G11B 5/607 360/75 |
| 8,730,602 B2 * | 5/2014 | Yang | G11B 5/6029 360/75 |
| 8,767,339 B2 * | 7/2014 | Zeng | G11B 5/607 360/75 |
| 8,848,309 B2 * | 9/2014 | Budde | G11B 5/607 360/75 |
| 8,873,191 B2 | 10/2014 | Li et al. | |
| 8,970,978 B1 | 3/2015 | Knigge et al. | |
| 8,976,481 B1 * | 3/2015 | Zeng | G11B 5/607 360/75 |
| 9,047,898 B2 * | 6/2015 | Liu | G11B 5/607 |
| 9,053,740 B1 | 6/2015 | Sharma et al. | |
| 9,245,561 B1 * | 1/2016 | Lee | G11B 5/6017 |
| 9,390,741 B2 * | 7/2016 | Johnson | G11B 5/6011 |
| 9,437,234 B1 * | 9/2016 | Kim | G11B 5/6076 |
| 9,548,072 B2 * | 1/2017 | Lou | G11B 5/607 |
| 9,607,642 B1 * | 3/2017 | Yang | G11B 5/607 |

* cited by examiner

*Primary Examiner* — Wayne Young
*Assistant Examiner* — James L Habermehl

(57) ABSTRACT

A data storage device is disclosed comprising a head actuated over a disk, wherein the head comprises a fly height actuator (FHA). A FHA control signal is applied to the FHA, wherein the FHA control signal comprises a DC component and an AC component. A fly height metric is measured representing a fly height of the head over the disk for different levels of the DC component. A modulation amplitude of the fly height metric is detected, and a minimum in the modulation amplitude of the fly height metric is detected.

22 Claims, 5 Drawing Sheets

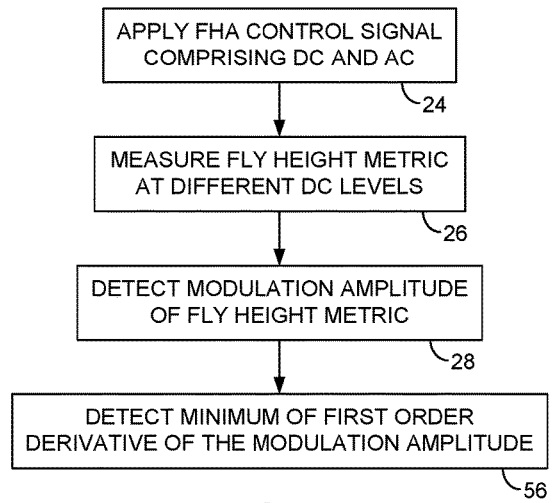
FIG. 8
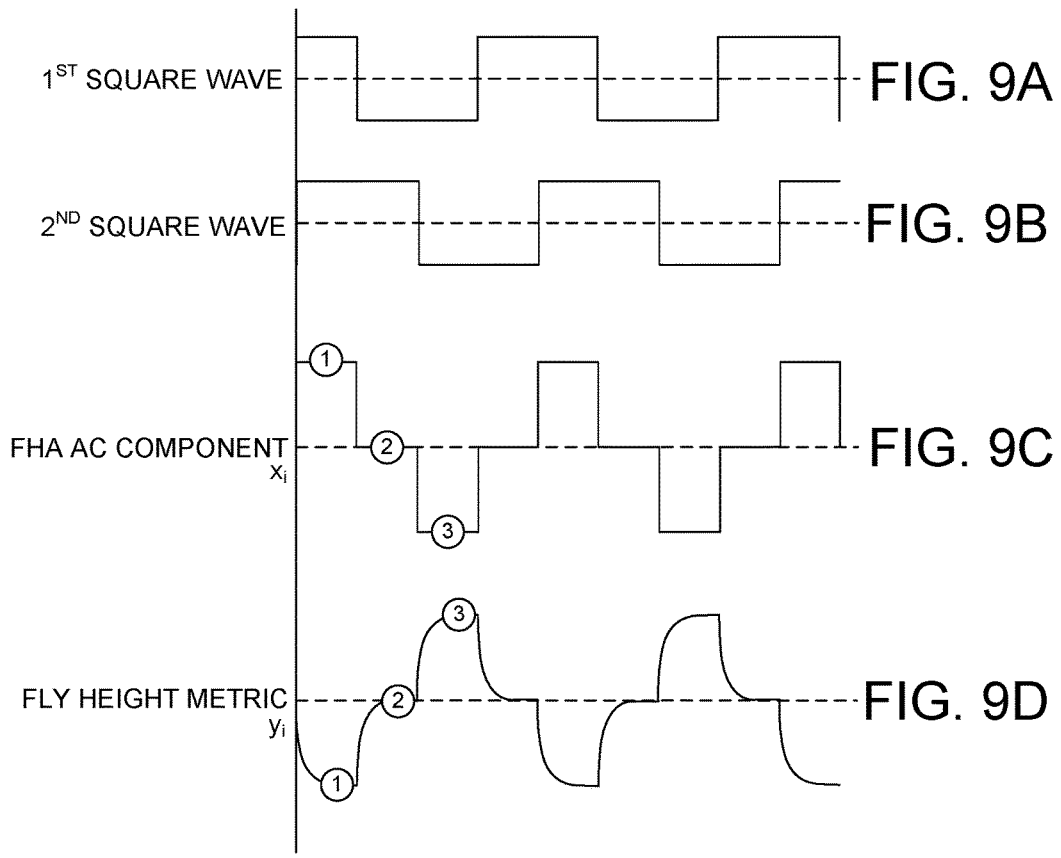
FIG. 9A
FIG. 9B
FIG. 9C
FIG. 9D

DATA STORAGE DEVICE DETECTING MINIMUM STABLE FLY HEIGHT OF A HEAD OVER A DISK

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 8 is a flow diagram according to an embodiment wherein a minimum of a first order derivative of the modulation amplitude is measured.

FIGS. 9A-9D show an embodiment for measuring the minimum of the first order derivative of the modulation amplitude by applying an FHA control signal comprising a first square wave and a second square wave phase offset from the first square wave.

DETAILED DESCRIPTION

Figures 2A, 2B, 2C:
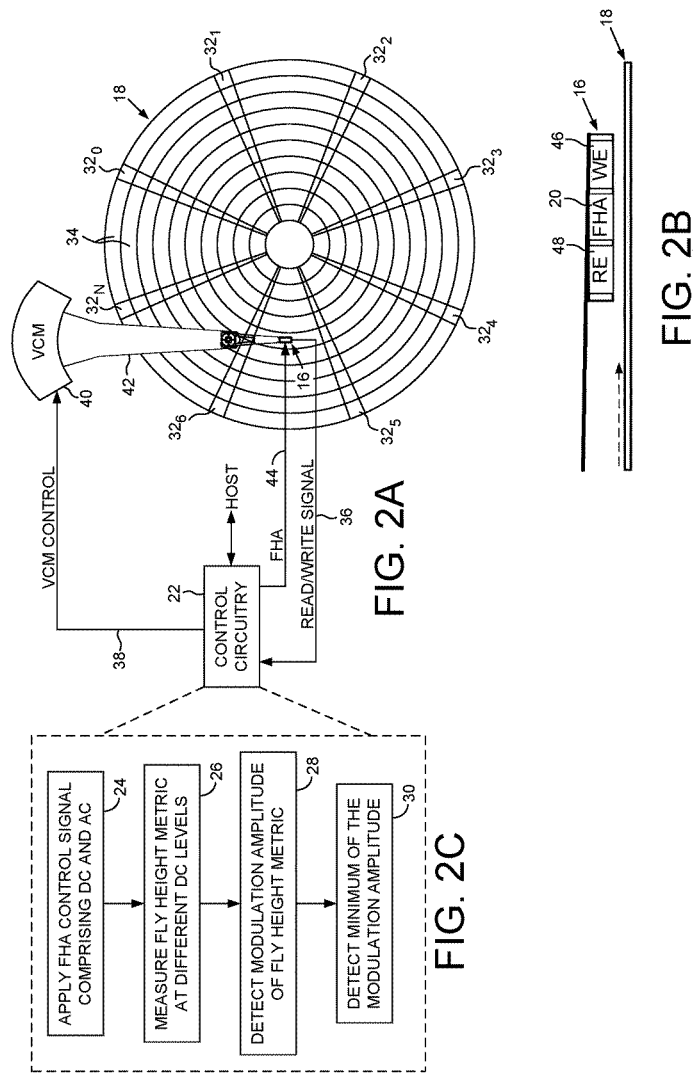
FIGS. 2A and 2B show a data storage device in the form of a disk drive according to an embodiment comprising a head actuated over a disk, wherein the head comprises a fly height actuator.
FIG. 2C is a flow diagram according to an embodiment wherein a fly height metric is measured while applying a DC and AC control signal to the FHA in order to detect a minimum in a modulation amplitude of the fly height metric.
Figure 4:
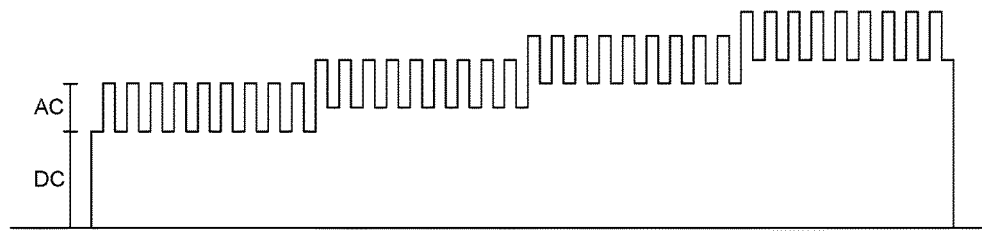
FIG. 4 shows an embodiment wherein the DC component of the FHA control signal is increased while measuring the modulation amplitude of the fly height metric.

FIGS. 2A and 2B show a data storage device in the form of a disk drive according to an embodiment comprising a head 16 actuated over a disk 18, wherein the head 16 comprises a fly height actuator (FHA) 20 such as shown in FIG. 2B. The disk drive further comprises control circuitry 22 configured to execute the flow diagram of FIG. 2C, wherein a FHA control signal is applied to the FHA (block 24). The FHA control signal comprises a DC component and an AC component, an example of which is shown in FIG. 4. A fly height metric is measured representing a fly height of the head over the disk for different levels of the DC component (block 26). A modulation amplitude of the fly height metric is detected (block 28), and a minimum in the modulation amplitude of the fly height metric is detected (block 30).

Figure 1:
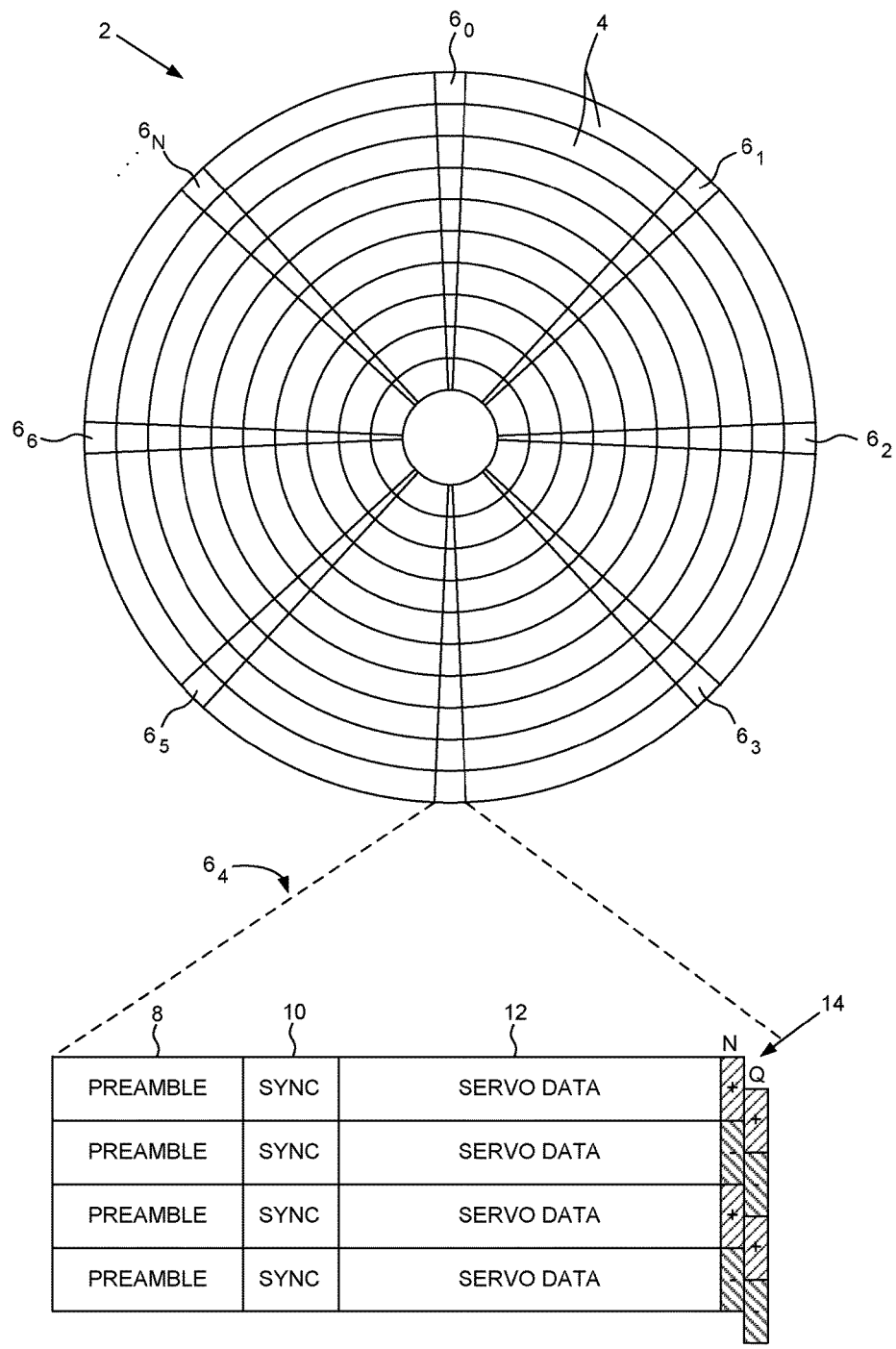
FIG. 1 shows a prior art disk format comprising a plurality of servo tracks defined by servo sectors.

In the embodiment of FIG. 2A, the disk 18 comprises embedded servo sectors $32_0$-$32_N$ that define a plurality of servo tracks 34, wherein data tracks are defined relative to the servo tracks (at the same or different radial density). The control circuitry 22 processes a read signal 36 emanating from the head 16 to demodulate the servo sectors $32_0$-$32_N$ into an estimated position. The estimated position is subtracted from a reference position to generate a position error signal (PES) representing an error between the actual position of the head and a target position relative to a target track. The PES is filtered using a suitable compensation filter to generate a control signal 38 applied to a voice coil motor (VCM) 40 which rotates an actuator arm 42 about a pivot in order to actuate the head 16 radially over the disk 18 in a direction that reduces the PES. The servo sectors $32_0$-$32_N$ may comprise any suitable position information, such as a track address for coarse positioning and servo bursts for fine positioning. The servo bursts may comprise any suitable pattern, such as an amplitude-based servo pattern (e.g., a quadrature servo pattern), or a suitable phase-based servo pattern (FIG. 1).

Any suitable FHA 20 may be employed in the embodiments of the present invention, such as a heater which controls fly height through thermal expansion, or a piezoelectric (PZT) actuator. In addition, the FHA control signal 44 applied to the FHA 20 may comprise any suitable signal, such as a current or a voltage applied to the FHA 20. In one embodiment, an operating setting for the FHA control signal 44 is generated based on the FHA control signal 44 that causes the head to reach a minimum stable fly height. In one embodiment employing a FHA control signal 44 comprising a DC component and an AC component improves the accuracy of the minimum stable fly height, thereby improving the accuracy of the operating setting for the FHA control signal 44.

The head 16 in the embodiment shown in FIG. 2B comprises a suitable write element 46 (e.g., a coil) and a suitable read element 48 (e.g., a magnetoresistive element). In one embodiment, the operating setting for the FHA control signal 44 may be configured for the write element 46 during write operations and configured differently for the read element 48 during read operations. Each write/read setting for the FHA control signal 44 may be configured by backing off the setting for the FHA control signal 44 that corresponds to the minimum stable fly height.

Figure 3:
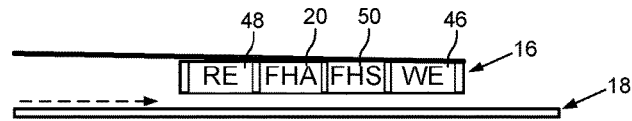
FIG. 3 shows an embodiment wherein the head comprises a fly height sensor for generating the fly height metric.

Any suitable fly height metric may be measured in the embodiments disclosed herein. In an embodiment shown in FIG. 3, the head 16 may comprise a suitable fly height sensor (FHS) 50 that generates a fly height signal corresponding to the fly height of the head 16 over the disk 18. In another embodiment, the fly height metric may be generated based on a Wallace spacing equation which measures an absolute head-media spacing (HMS) according to a ratio of the amplitude of the read signal at two different harmonics while reading a periodic pattern from the disk 18 (e.g., a test pattern or a pattern recorded in a servo sector). In another embodiment, this harmonic ratio can be generated by reading a periodic pattern at two different frequencies (e.g., a 2T and 6T pattern).

The FHA control signal 44 may comprise any suitable waveform, wherein in an embodiment shown in FIG. 4, the DFH control signal 44 comprises an AC component in the form of a square wave added to a DC component. In the embodiment shown in FIG. 4, the DC component is increased (without increasing the amplitude of the AC component) until the minimum in the modulation amplitude of the fly height metric is detected. The DC component may be increased based on any suitable function, such as a step increase of the DC component as shown in FIG. 4. The duration of each step may last any suitable interval, such as one or more revolutions of the disk, or a partial revolution of the disk.

In one embodiment, the frequency of the AC component may equal an integer multiple of the disk rotation frequency such that the AC component is substantially synchronous with the disk rotation frequency. In one embodiment, the state of the AC component (high or low) may be changed after reading a predetermined number of servo sectors. For example, the state of the AC component may be high for three servo sectors and then toggled low for the following three servo sectors, and so on. In one embodiment, the fly height metric may be measured at periodic points, such as at every servo sector, and in another embodiment, the fly height metric may be measured substantially continuous.

Figure 5:
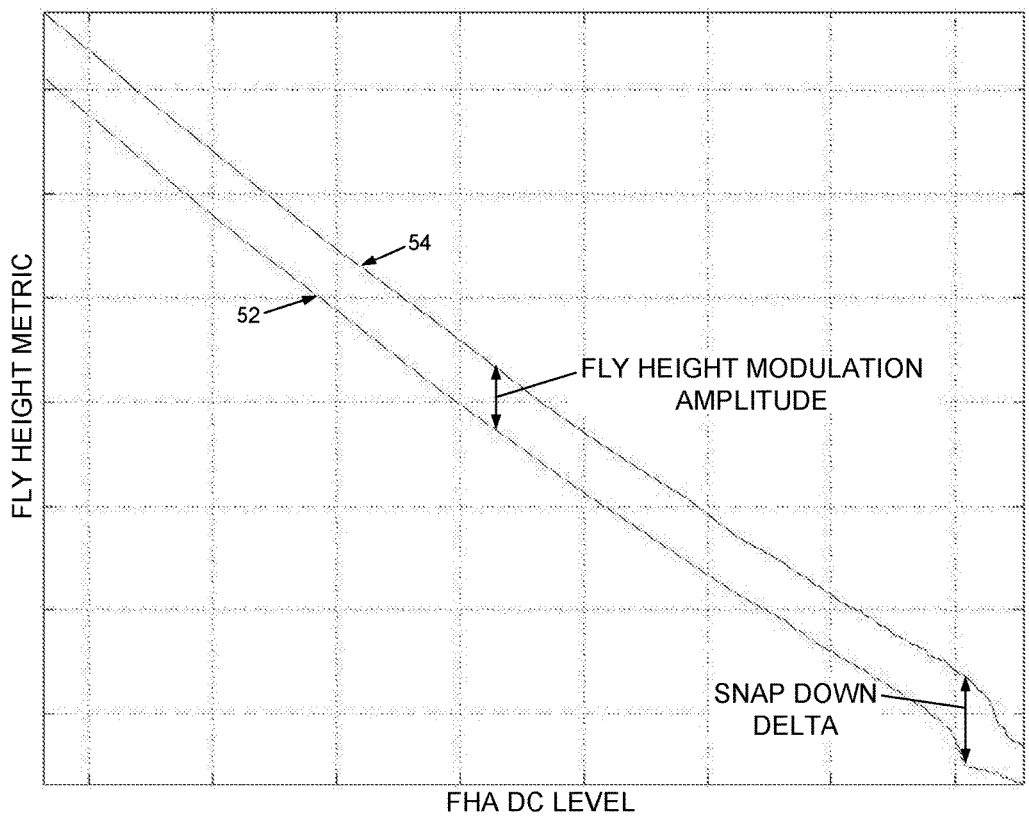
FIG. 5 shows an actuation curve showing the measured fly height metric versus the DC level of the FHA control signal, including the modulation amplitude according to an embodiment.
Figure 6:
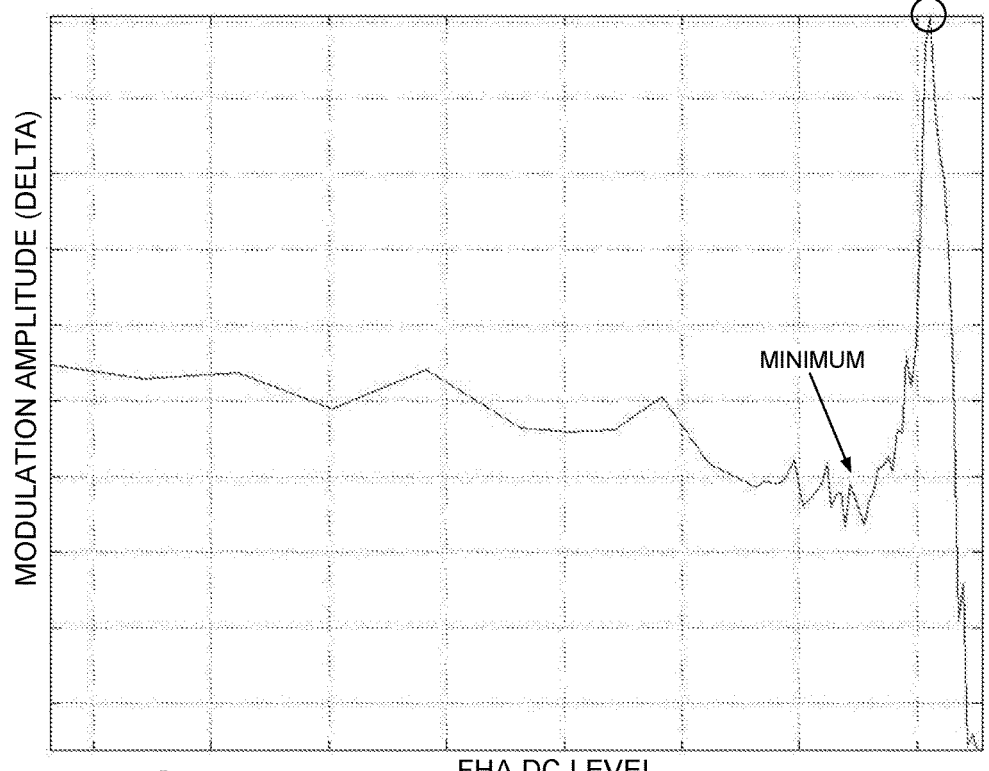
FIG. 6 shows an embodiment wherein the minimum of the modulation amplitude of the fly height metric represents a minimum stable fly height for the head.

FIG. 5 shows an actuation curve according to an embodiment that is generated by measuring the fly height metric while increasing the level of the DC component of the FHA control signal 44 such as shown in FIG. 4. The lower actuation curve 52 corresponds to the fly height metric while the AC level is high, and the upper actuation curve 54 corresponds to the fly height metric while the AC level is low, wherein the difference or delta between the two curves represents the modulation amplitude of the fly height metric. In one embodiment, as the DC level increases the modulation amplitude decreases until it reaches a minimum which represents a minimum stable fly height for the head as illustrated in FIG. 6. Increasing the DC level beyond this point causes the head to "snap down" and contact the disk while the AC level is high. As the DC level increases further, the modulation amplitude approaches zero as both the high AC level and low AC level cause the head to snap down and contact the disk. In one embodiment, the operating FHA control signal 44 is configured by subtracting an offset from the DC level corresponding to the minimum modulation amplitude (minimum stable fly height).

Figure 7:
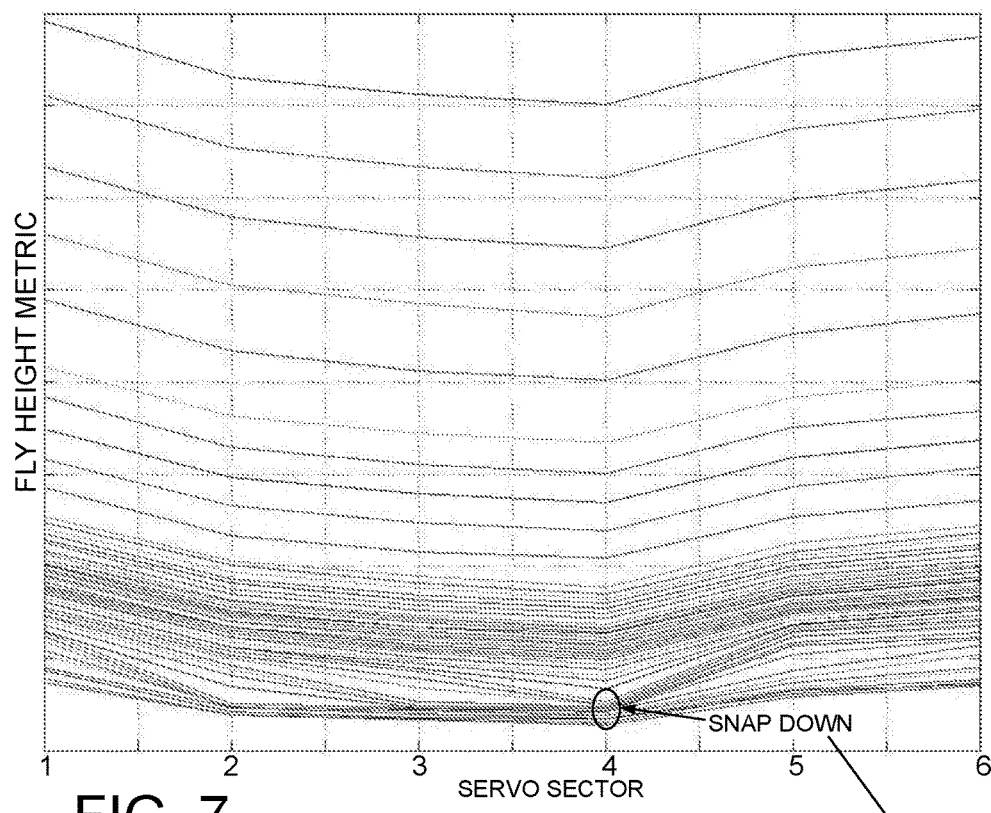
FIG. 7 shows an embodiment wherein the fly height metric is averaged over a number of cycles of the AC component of the FHA control signal.

The modulation amplitude of the fly height metric may be measured using any suitable technique. In one embodiment, the modulation amplitude is measured by detecting a delta between a maximum of the fly height metric at the high AC level and a minimum of the fly height metric measured at the low AC level. In one embodiment, the fly height metric may be averaged over multiple cycles of the AC component in order to attenuate noise in the fly height metric. FIG. 7 illustrates an example of this embodiment wherein the AC component is high at every $2^{nd}$, $3^{rd}$ and $4^{th}$ servo sector over a disk revolution, and the AC component is low at every $1^{st}$, $5^{th}$, and $6^{th}$ servo sector. The fly height metric measured at every $n^{th}$ servo sector are averaged, thereby generating the curves shown in FIG. 7 each of which corresponds to an increasing DC level of the FHA control signal (from top curve to bottom curve). In this embodiment, the modulation amplitude of the fly height metric may be measured as the delta between the maximum and minimum of each curve shown in FIG. 7. As shown in FIG. 6, the modulation amplitude reaches a minimum at the DC level of the FHA control signal that corresponds to the minimum stable fly height of the head.

In other embodiments, the modulation amplitude of the fly height metric may be measured using any other suitable statistical or signal processing technique, such as by computing a standard deviation (sigma) and/or a root-mean-square (RMS) of the fly height metric. In yet another embodiment, the modulation amplitude may be measured by computing the amplitude of the first harmonic of the fly height metric, such as by computing a discrete Fourier transform (DFT) of the fly height metric.

Any suitable technique may be employed to detect when the modulation amplitude of the fly height metric reaches a minimum such as shown in FIG. 6. FIG. 8 is a flow diagram according to an embodiment wherein a first order derivative of the modulation amplitude is computed (block 56) which corresponds to the minimum of the modulation amplitude. In an embodiment shown in FIGS. 9A-9D, the minimum of the first order derivative may be computed by generating an FHA control signal having an AC component that comprises a first square wave (FIG. 9A) and a second square wave (FIG. 9B) phase offset from the first square wave. The resulting AC component as shown in FIG. 9C comprises three different levels with three corresponding levels in the fly height metric as shown in FIG. 9D. The resulting first order derivatives:

$$\left.\frac{\partial y}{\partial x}\right|_+ = \frac{y_1 - y_2}{x_1 - x_2}$$

$$\left.\frac{\partial y}{\partial x}\right|_- = \frac{y_2 - y_3}{x_2 - x_3}$$

Where $x_i$ represents a level of the AC component shown in FIG. 9C and $y_i$ represents a corresponding fly height metric as shown in FIG. 9D. The second order derivative may then be computed as:

$$\frac{\partial^2 y}{\partial x^2} = \frac{\left.\frac{\partial y}{\partial x}\right|_+ - \left.\frac{\partial y}{\partial x}\right|_-}{x_+ - x_-} =$$

$$\frac{\frac{y_1 - y_2}{x_1 - x_2} - \frac{y_2 - y_3}{x_2 - x_3}}{\frac{x_2 + x_1}{2} - \frac{x_3 + x_2}{2}} = \frac{\frac{y_1 - y_2}{\Delta x} - \frac{y_2 - y_3}{\Delta x}}{\Delta x} = \frac{y_1 + y_3 - 2y_2}{\Delta x^2}$$

In this embodiment, the first order derivative reaches a minimum when the second order derivative as computed above is zero.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk, wherein the head comprises a fly height actuator (FHA);
   control circuitry configured to:
      apply a FHA control signal to the FHA, wherein the FHA control signal comprises a DC component and an AC component;
      measure a fly height metric representing a fly height of the head over the disk for different levels of the DC component;
      detect a modulation amplitude of the fly height metric; and
      detect a minimum in the modulation amplitude of the fly height metric.

2. The data storage device as recited in claim 1, wherein the detected minimum in the modulation amplitude of the fly height metric represents a minimum stable fly height of the head.

3. The data storage device as recited in claim 1, wherein the control circuitry is further configured to measure the modulation amplitude of the fly height metric by measuring a delta between a maximum of the fly height metric and a minimum of the fly height metric.

4. The data storage device as recited in claim 3, wherein the AC component comprises a square wave.

5. The data storage device as recited in claim 4, wherein the control circuitry is further configured to:
   generate the maximum of the fly height metric by averaging the fly height metric measured when the square wave is high; and
   generate the minimum of the fly height metric by averaging the fly height metric measured when the square wave is low.

6. The data storage device as recited in claim 1, wherein the control circuitry is further configured to measure the modulation amplitude of the fly height metric by measuring a root-mean-square (RMS) of the fly height metric.

7. The data storage device as recited in claim 1, wherein the control circuitry is further configured to detect the minimum in the modulation amplitude of the fly height metric by detecting when a first order derivative of the fly height metric is minimum.

8. The data storage device as recited in claim 1, wherein the control circuitry is further configured to detect the minimum in the modulation amplitude of the fly height metric by detecting when a second order derivative of the fly height metric is zero.

9. The data storage device as recited in claim 8, wherein the AC component comprises a first period signal and a second periodic signal phase offset from the first periodic signal.

10. The data storage device as recited in claim 9, wherein the first periodic signal is a first square wave and the second periodic signal is a second square wave phase offset from the first square wave.

11. The data storage device as recited in claim 10, wherein the control circuitry is further configured to detect when the second order derivative of the fly height metric is zero based on:

$$\frac{y_1 + y_3 - 2y_2}{\Delta x^2}$$

where $y_1$, $y_2$ and $y_3$ are fly height metrics measured at different levels of the AC component and $\Delta x$ represents a difference between different levels of the AC component.

12. A method of operating a data storage device, the method comprising:
   applying a fly height actuator (FHA) control signal to an FHA configured to control a fly height of a head over a disk, wherein the FHA control signal comprises a DC component and an AC component;
   measuring a fly height metric representing the fly height of the head over the disk for different levels of the DC component;
   detecting a modulation amplitude of the fly height metric; and
   detecting a minimum in the modulation amplitude of the fly height metric.

13. The method as recited in claim 12, wherein the detected minimum in the modulation amplitude of the fly height metric represents a minimum stable fly height of the head.

14. The method as recited in claim 12, further comprising measuring the modulation amplitude of the fly height metric by measuring a delta between a maximum of the fly height metric and a minimum of the fly height metric.

15. The method as recited in claim 14, wherein the AC component comprises a square wave.

16. The method as recited in claim 15, further comprising:
   generating the maximum of the fly height metric by averaging the fly height metric measured when the square wave is high; and
   generating the minimum of the fly height metric by averaging the fly height metric measured when the square wave is low.

17. The method as recited in claim 12, further comprising measuring the modulation amplitude of the fly height metric by measuring a root-mean-square (RMS) of the fly height metric.

18. The method as recited in claim 12, further comprising detecting the minimum in the modulation amplitude of the fly height metric by detecting when a first order derivative of the fly height metric is minimum.

19. The method as recited in claim 12, further comprising detecting the minimum in the modulation amplitude of the fly height metric by detecting when a second order derivative of the fly height metric is zero.

20. The method as recited in claim 19, wherein the AC component comprises a first period signal and a second periodic signal phase offset from the first periodic signal.

21. The method as recited in claim 20, wherein the first periodic signal is a first square wave and the second periodic signal is a second square wave phase offset from the first square wave.

22. The method as recited in claim 21, further comprising detecting when the second order derivative of the fly height metric is zero based on:

$$\frac{y_1 + y_3 - 2y_2}{\Delta x^2}$$

where $y_1$, $y_2$ and $y_3$ are fly height metrics measured at different levels of the AC component and $\Delta x$ represents a difference between different levels of the AC component.

* * * * *